May 12, 1942.  J. H. VAN UUM  2,283,151
SPRING FASTENING DEVICE
Filed May 14, 1941
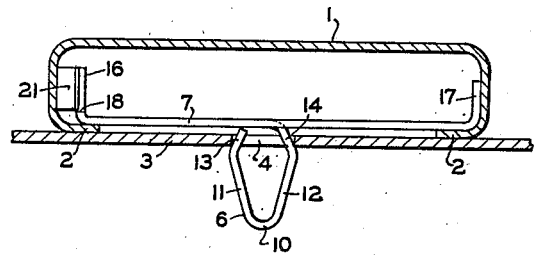
FIG.1
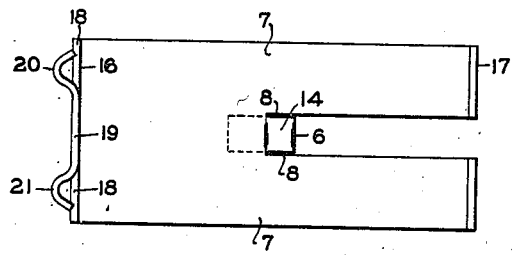
FIG.2
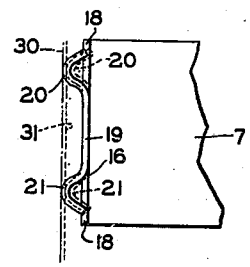
FIG.3
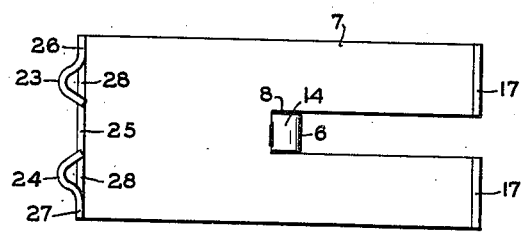
FIG.4
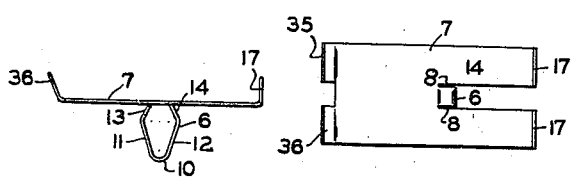
FIG.5   FIG.6
INVENTOR.
JOHN H. VAN UUM
BY 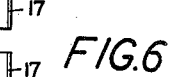
HIS  ATTORNEY Patented May 12, 1942

2,283,151

UNITED STATES PATENT OFFICE 2,283,151

SPRING FASTENING DEVICE

John H. Van Uum, Lakewood, Ohio

Application May 14, 1941, Serial No. 393,425

5 Claims. (Cl. 24—73)

This invention relates to a spring clip device for securing hollow members to apertured supporting structure by interengagement of the spring clip with the hollow member and with the aperture of the support.

One of the principal objects of the present invention is to provide a spring clip retaining device in which means are provided for compensating for differences and variations in the width of the hollow member such as the usual bead trim molding used on automobile body constructions.

Another object is to provide a spring clip retaining device for this general purpose and which is further characterized in that the head, though generally rigid, has a portion which may flex, to compensate for the above mentioned variations, independently of the flexure of the shank portion of the device whereby flexure of the trim engaging portion does not disturb or effect the retaining action of the shank portion of the device in the aperture of the support.

Another object is to provide a spring clip retaining device having the above mentioned characteristics and which while accomplishing the mentioned desired results will maintain its proper centered position with respect to the hollow member or trim molding and will resist forces tending to rotate the device about the axis of the shank whereby cocking or wedging of the relatively rigid head of the fastener in the trim member is eliminated.

Other objects, advantages and uses will become apparent from the following specification wherein reference is made to the drawing, in which:

Fig. 1 is a sectional view through a hollow trim member and support, showing in elevation the spring clip retaining device connecting the hollow trim member to the support.

Fig. 2 is a top plan view of the device illustrated in Fig. 1;

Fig. 3 is a view similar to Fig. 2 illustrating the manner in which the flexible head portions compensate for various widths of hollow trim members;

Fig. 4 is a top plan view of a modified form of the spring clip retaining device;

Fig. 5 is a front elevation of still another modified form of my device, and

Fig. 6 is a top plan view of the device illustrated in Fig. 5.

For purposes of illustration, the spring clip retaining device is illustrated and described in connection with the retaining of trim molding such as used on the usual automobile body construction, its uses for other purposes being readily apparent from the illustrative examples.

Referring to the drawing, the spring clip device is shown as securing a hollow member 1, such as the bead trim molding now widely used for decorative purpose in automobile body construction, and having inturned flanges 2, to an apertured support 3 having an aperture 4 therein.

The spring clip device, formed of a single strip of uniform width of spring metal or the like, is illustrated in Figs. 1 to 3, inclusive, and comprises a substantially diamond shaped portion in the form of a shank 6, and a generally rigid head comprising a rigid base portion 7 which extends laterally on each side of the shank portion and is provided with suitable trim member securing portions, later to be described. The shank 6 projects or depends normal to the plane of the base portion 7 at one face thereof. The base portion 7 is slit, preferably from the side, as at 8, to form a relatively elongated tongue which is disposed centrally of the width of the base portion 7. This tongue is bent downwardly from the base portion 7 to form the shank 6 which is in the form of a rounded nose 10 from which extend divergent legs 11 and 12, the legs 11 and 12 being bent inwardly near the base portion 7 to form sloping locking shoulders 13 and 14, respectively. The shoulders 13 and 14 are arranged for gripping engagement with the inner surface of the support when the shank 6 is passed into the aperture 4, the legs 11 and 12 being compressed thereby toward each other to allow the shank to completely enter the aperture, and thereafter expanding toward their normal unflexed position to secure the device in the support.

The laterally extending base portion 7 of the head is provided with upturned head portions 16 and 17 at its lateral edges on each side of the shank 6 and preferably about equidistant from each side of the shank. In the form illustrated in Figs. 1 and 2 the upturned head portion 16 is slit at 18 partway of its length from its outer end toward the center of the head portion 16. Each slit 18 terminates in spaced relation to the other at its inner end to provide the intermediate connecting portion 19, forming the independently flexible fingers or head portions 20 and 21. Each of the fingers 20 and 21 is bent outwardly, from the connecting portion 19, and extends outwardly beyond the lateral limits of the rigid base portion 7. The fingers are equidistant from the edge of the base portion 7. The flexible fingers 20 and 21 are bent inwardly at their free ends toward the shank 6 of the device and are flexible independently of the flexure of the shank portion of the device. The fingers 20 and 21 are preferably convexly rounded or curvilinear in a direction about an axis normal to the base portion 7, for purposes later to be described.

The modified form illustrated in Fig. 4 is identical to the device illustrated in Figs. 1 and 2 except that the flexible fingers 23 and 24 are integral with the upturned head 25 at the edges of the head, as at 26 and 27, respectively, and are free at the mid-portion of the head portion 25, whereas in the preferred form illustrated in Figs. 1 and 2, the fingers 20 and 21 are connected to each other at the mid-portion of the head portion 16, as at 19, and have their free ends disposed outwardly of the said mid-portion or adjacent the edges of the base portion 7. To provide the fingers 23 and 24, the upturned head 25 is slit endwise at its mid-portion, as indicated at 28, the slit extending partway of the length of the upturned head 25 and in spaced relation to the ends of the head. Another connecting slit is provided at right angles from the slit 28 to the top edge of the head portion 25 to define the peripheral limits of the flexible fingers 23 and 24. Each of the fingers 23 and 24 is bent outwardly from its connected end and extends beyond the lateral limits of the rigid base portion 7 as in the form illustrated in Figs. 1 and 2. The free ends of the fingers are then bent inwardly toward each other and terminate in spaced relation to each other.

It should be noted that due to the convex shape of the outer surfaces of the flexible fingers 20 and 21 of the device illustrated in Figs. 1 and 2, and of the flexible fingers 23 and 24 of the device illustrated in Fig. 4, the device may be readily moved along the lengthwise dimension of the trim 1, and thus a plurality of these devices may be accurately positioned in predetermined spaced relation prior to the installation of the trim on the support 2. Since the flexible fingers extend beyond the lateral edges of the base portion 7 and are free to flex inwardly toward the shank portion 6, any variation in width of the trim member are compensated for and without affecting the operation of the device.

As better illustrated in Fig. 3, the flexible fingers 20 and 21 normally contact the inner surface of the trim member 1 as illustrated by the dot and dash line 30. If, however, the trim varies in width throughout its length either due to intentional design or manufacturing inaccuracies, as is the event in many cases, or if the device is to be used in various sizes of trim members, the flexible fingers or head portions are flexed inwardly toward the position illustrated in dotted lines 31 in Fig. 3 and will contact the trim along the dotted line 31 of Fig. 3.

In the forms illustrated in Figs. 1 to 4, inclusive, as heretofore pointed out the flexible fingers 20, 21, 23 and 24 are provided on only one of the lateral edges of the base portions of the device and are convexly rounded to resiliently engage the inner surface of the trim member, the other lateral edge of the base portion 7 being provided with substantially rigid upturned head portions 17 to engage the opposite inner surface of the trim member. It also has been pointed out heretofore that the flexible fingers are positioned equidistantly from the edge of the base portion 7. Due to the above described curvilinear shape and position of the flexible fingers, the device will be firmly secured within the trim member in proper centered position, and rocking or rotation of the base and head portions about an upright axis of the shank 6 either before or after assembly in the support 2 is prevented, as the flexible fingers 20, 21, and 23, 24 will exert equal outward pressure to properly center the device within the trim and tend to resist the above-mentioned rotation.

The modified form illustrated in Figs. 5 and 6 differs from the preferred form only in that the base portion 7 is provided with flexible fingers 35 and 36 at one lateral edge thereof. The flexible fingers 35 and 36 extend upwardly and outwardly beyond the lateral limits of the rigid base portion 7 and are spaced from each other in order that they may flex independently of each other and independently of the flexure of any other portion of the device.

Having thus described my invention, I claim:
1. A spring clip retaining device formed of a single strip of spring metal for securing a hollow member to an apertured support and comprising a laterally extending relatively rigid base provided with upturned head portions at its edges, a depending shank portion between the said upturned head portions and joining the said base portion at a position in spaced relation to one of said upturned portions, said shank portion extending away from the plane of the base and being in the form of a loop which is compressible and expansible for yieldable engagement with the aperture in the said support for securing the hollow member to the support, each of said upturned head portions extending transversely to the plane of the shank and lying generally in a plane normal to the plane of the shank, said upturned head portions having fingers which are resilient for flexing independently of the shank toward and away from the shank and extending outwardly beyond lateral limits of the said base portion.

2. A spring clip retaining device formed of a single strip of spring metal for securing a hollow member to an apertured support and comprising a laterally extending base provided with upturned portions at its edges, a shank portion between the said upturned head portions and joining the said base portion at one end at a position in spaced relation to one of said upturned portions and being free at its other end, said shank portion extending from its joined end and away from the plane of the base partway of its length and back toward the base for the remainder of its length in the form of a loop which is compressible and expansible for yieldable engagement with the aperture in the said support for securing the hollow member to the support, each of said upturned head portions extending transversely to the plane of the shank and lying generally in a plane normal to the plane of the shank, and at least one of said upturned head portions having resilient fingers which extend outwardly beyond lateral limits of the said base portion.

3. A spring clip retaining device formed of a single strip of spring metal for securing a hollow member to an apertured support and comprising a laterally extending relatively rigid base provided with upturned head portions at its edges, a depending shank portion between the said upturned head portions and joining the said base portion at a position in spaced relation to one of said upturned portions, said shank portion extending away from the plane of the base and being in the form of a loop which is compressible and expansible for yieldable engagement with the aperture in the said support for securing the hollow member to the support, each of said upturned head portions extending transversely to the plane of the shank and lying generally in a plane normal to the plane of the shank, said upturned head portions having resilient fingers for flexing independently of the shank toward and away from the shank and which are curvilinear in shape in a direction about the upright axis of the said shank and extend outwardly beyond lateral limits of the said base portion.

4. A spring clip retaining device formed of a single strip of spring metal for securing a hollow member to an apertured support and comprising a laterally extending relatively rigid base provided with upturned head portions at its edges, a depending shank portion between the said upturned head portions and joining the said base portion at a position in spaced relation to one of said upturned portions, said shank portion extending away from the plane of the base and being in the form of a loop which is compressible and expansible for yieldable engagement with the aperture in the said support for securing the hollow member to the support, each of said upturned head portions extending transversely to the plane of the shank and lying generally in a plane normal to the plane of the shank, one of said upturned head portions having fingers which are resilient for flexing independently of the shank toward and away from the shank, the said fingers being integrally connected to each other at the mid-portion of the said upturned head portion and are bowed outwardly to extend beyond lateral limits of the said base portion.

5. A spring clip retaining device formed of a single strip of spring metal for securing a hollow member to an apertured support and comprising a laterally extending relatively rigid base provided with upturned head portions at its edges, a depending shank portion between the said upturned head portions and joining the said base portion at a position in spaced relation to one of said upturned portions, said shank portion extending away from the plane of the base and being in the form of a loop which is compressible and expansible for yieldable engagement with the aperture in the said support for securing the hollow member to the support, each of said upturned head portions extending transversely to the plane of the shank and lying generally in a plane normal to the plane of the shank, one of the said upturned head portions having fingers which are resilient for flexing independently of the shank toward and away from the shank, the said fingers being integrally connected at one end to the said upturned head portion adjacent the edges of the said base portion and are free at their other ends and are convexed outwardly of the upturned head portion to extend beyond the lateral limits of the said base portion.

JOHN H. VAN UUM.